US012652174B1

(12) United States Patent
Stapleton et al.

(10) Patent No.: US 12,652,174 B1
(45) Date of Patent: Jun. 9, 2026

(54) DERIVED UNIQUE KEY PER HASH ENCAPSULATED ENCRYPTED TRANSACTION (DUKPHEET)

(71) Applicant: Wells Fargo Bank, N.A., San Francisco, CA (US)

(72) Inventors: Jeffrey J. Stapleton, O'Fallon, MO (US); Peter Bordow, Fountain Hills, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 34 days.

(21) Appl. No.: 18/949,769

(22) Filed: Nov. 15, 2024

(51) Int. Cl.
| | |
|---|---|
| *H04L 29/06* | (2006.01) |
| *H04L 9/08* | (2006.01) |
| *H04L 9/14* | (2006.01) |
| *H04L 9/32* | (2006.01) |

(52) U.S. Cl.
CPC .......... *H04L 9/3242* (2013.01); *H04L 9/0852* (2013.01); *H04L 9/0869* (2013.01); *H04L 9/14* (2013.01)

(58) Field of Classification Search
CPC ... H04L 9/3242; H04L 9/0852; H04L 9/0869; H04L 9/14
See application file for complete search history.

(56) References Cited

U.S. PATENT DOCUMENTS

| | | | | |
|---|---|---|---|---|
| 8,595,490 | B2* | 11/2013 | von Mueller | .......... G06Q 20/12 |
| | | | | 713/168 |
| 10,764,036 | B1* | 9/2020 | Griffin | .................... H04L 63/06 |
| 11,177,950 | B2* | 11/2021 | Lo | ........................... H04L 9/083 |
| 11,212,090 | B1* | 12/2021 | Griffin | .................. H04L 63/067 |

* cited by examiner

*Primary Examiner* — Harunur Rashid
(74) *Attorney, Agent, or Firm* — Foley & Lardner LLP

(57) ABSTRACT

The arrangements disclosed herein relate to generating, by a first server, a first seed using a Hash-Based Message Authentication Code (HMAC) based at least in part on a Hash Key (HK), providing, by the first server to each of a first device and a second device, the first seed, providing, by a second server to each of the first device or the second device, a second seed. The second seed is based at least in part on a stream of photons. Each of the first device or the second device generates a Derived Key (DK) based at least in part on the first seed and the second seed. Each of the first device or the second device generates a first key based at least in part on the DK and a first random number generated by a Quantum Random Number Generator (QRNG). The first device encrypts first data using the first key to obtain first ciphertext and provides the first ciphertext to the second device. The second device derives the first key and decrypts the first ciphertext using the first key.

14 Claims, 5 Drawing Sheets

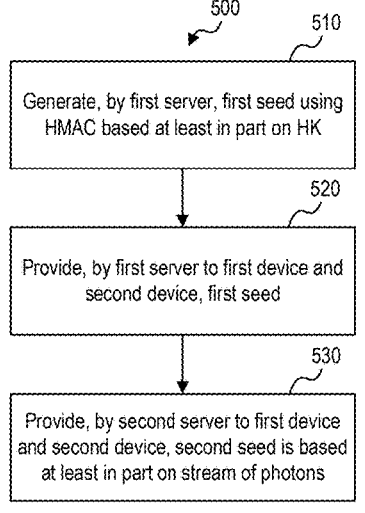

*500*

510

Generate, by first server, first seed using HMAC based at least in part on HK

520

Provide, by first server to first device and second device, first seed

530

Provide, by second server to first device and second device, second seed is based at least in part on stream of photons

FIG. 5

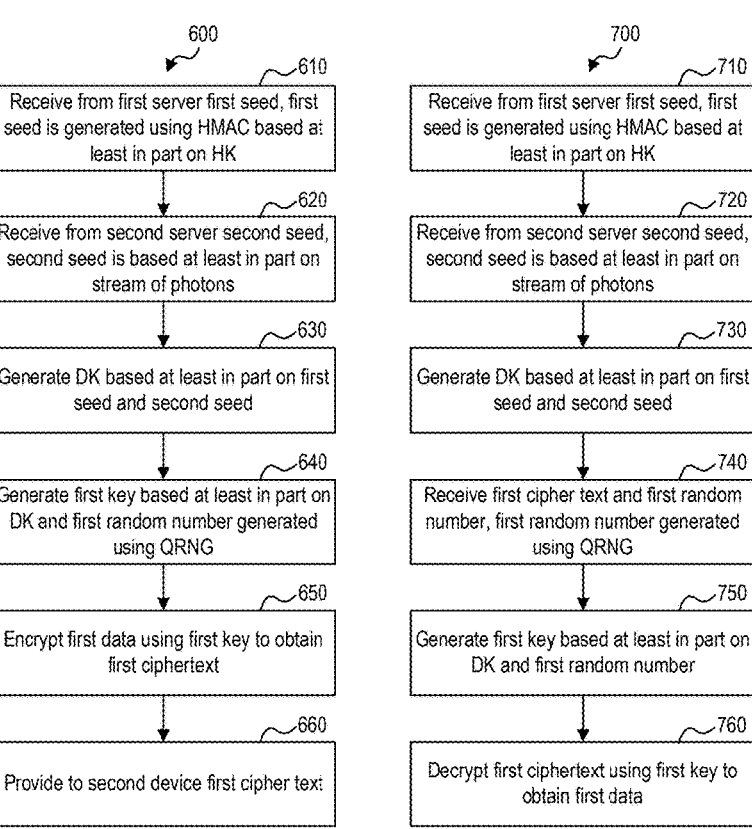

*600*

610

Receive from first server first seed, first seed is generated using HMAC based at least in part on HK

620

Receive from second server second seed, second seed is based at least in part on stream of photons

630

Generate DK based at least in part on first seed and second seed

640

Generate first key based at least in part on DK and first random number generated using QRNG

650

Encrypt first data using first key to obtain first ciphertext

660

Provide to second device first cipher text

Receive from first server first seed, first seed is generated using HMAC based at least in part on HK

720

Receive from second server second seed, second seed is based at least in part on stream of photons

730

Generate DK based at least in part on first seed and second seed

740

Receive first cipher text and first random number, first random number generated using QRNG

750

Generate first key based at least in part on DK and first random number

760

Decrypt first ciphertext using first key to obtain first data

FIG. 7

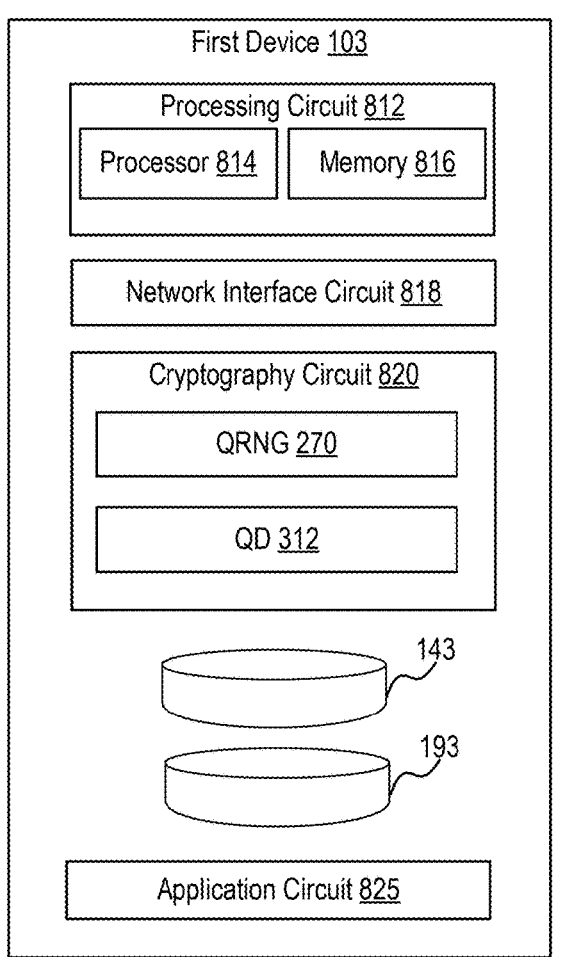
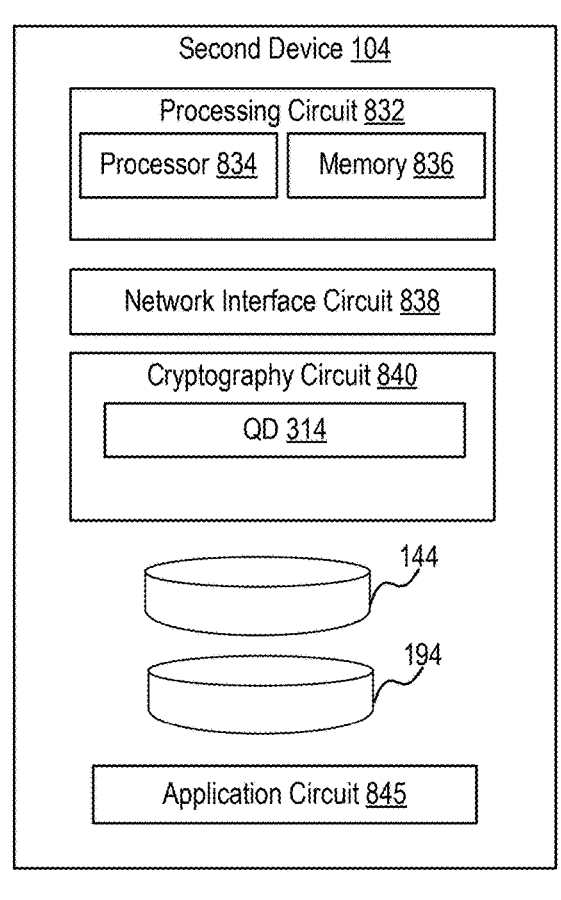
FIG. 8
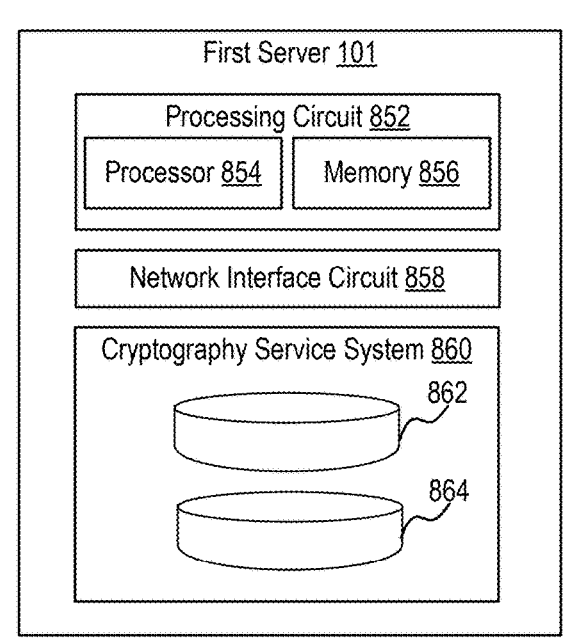

DERIVED UNIQUE KEY PER HASH ENCAPSULATED ENCRYPTED TRANSACTION (DUKPHEET)

BACKGROUND

In conventional cryptographic methods, establishing shared keys between two participant devices within a security domain can be challenging in terms of time, resources, and security. Deriving unique keys per transaction, despite of being the standard for years, remains a challenge at implementation.

SUMMARY arrangements disclosed herein relate to generating, by a first server, a first seed using a Hash-Based Message Authentication Code (HMAC) based at least in part on a Hash Key (HK), providing, by the first server to each of a first device and a second device, the first seed, providing, by a second server to each of the first device or the second device, a second seed. The second seed is based at least in part on a stream of photons. Each of the first device or the second device generates a Derived Key (DK) based at least in part on the first seed and the second seed. Each of the first device or the second device generates a first key based at least in part on the DK and a first random number generated by a Quantum Random Number Generator (QRNG). The first device encrypts first data using the first key to obtain first ciphertext and provides the first ciphertext to the second device. The second device derives the first key and decrypts the first ciphertext using the first key.

These and other features, together with the organization and manner of operation thereof, will become apparent from the following detailed description when taken in conjunction with the accompanying drawings.

BRIEF DESCRIPTION OF THE DRAWINGS

FIG. 5 is a flowchart diagram illustrating an example method for first server and the second server to provide seeds to the first device and the second device, according to various arrangements.

FIG. 6 is a schematic diagram illustrating an example method for key generation and encryption between two participants within a same security domain, according to various arrangements.

FIG. 7 is a schematic diagram illustrating an example method for key generation and encryption between two participants within a same security domain, according to various arrangements.

FIG. 8 illustrates block diagrams of an examples of the first server, the first device, and the second device, according to some arrangements.

DETAILED DESCRIPTION

The arrangements of the present disclosure is related to Derived Unique Key Per Hash Encapsulated Encrypted Transaction (DUKPHEET), including a Derived Unique Key Per Transaction scheme incorporating Hash-Based Message Authentication Code (HMAC) (e.g., hash) from Database Encryption Key Management (DBEKM) and Quantum Key Distribution (QKD) and Quantum Random Number Generator (QRNG) for random numbers encapsulate with encrypted data. In some arrangements, a central service (e.g., a first server) establishes a first seed between two participants (e.g., first and second devices) within the same security domain, and another service (e.g., a second server) establishes a second seed between the participants. A first participant (e.g., a first device) uses a random number generator to derive an encryption key and sends ciphertext to a second participant (e.g., a second device), and the second participant derives the same key to decrypt the ciphertext.

Figure 1:
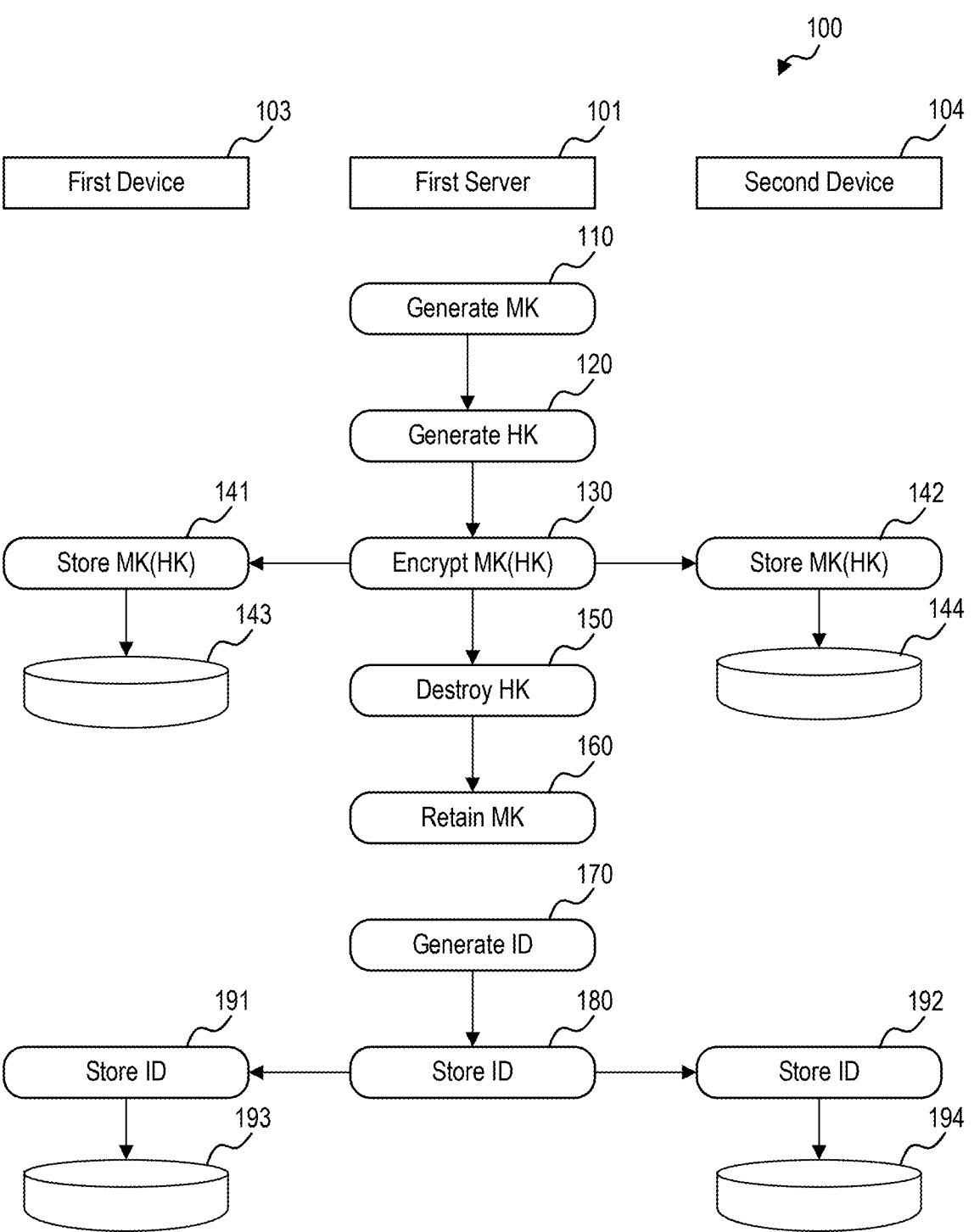
FIG. 1 is a schematic diagram illustrating an example method for establishing a shared Hash Key (HK) between two participants within a same security domain, according to various arrangements.

FIG. 1 is a schematic diagram illustrating an example method 100 for establishing a shared Hash Key (HK) between two participants within a same security domain, according to various arrangements. The method 100 can be performed using a first server 101, a first device 103, and a second device 104. The blocks in the central column of FIG. 1 are performed by the first server 101 (e.g., a central service). The blocks in the left column of FIG. 1 are performed by the first device 103. The blocks in the right column of FIG. 1 are performed by the second device 104. The HK is to be used by the first device 103 (e.g., a sender) to encrypt data to be sent to the second device 104 (e.g., a receiver), which decrypts the received ciphertext using HK, as shown in FIG. 2.

At 110, the first server 101 generates a Master Key (MK). At 120, the first server 101 generates an HK. The first server 101 can generate the MK and the HK using suitable Key Derivation Functions (KDFs) or protocols. At 130, the first server 101 encrypts the HK with the MK to generated encrypted key, e.g., MK(HK). The first server 101 sends the encrypted key MK(HK) to the two participants (e.g., the first device 103 and the second device 104) within the same security domain. The first device 103 receives the encrypted key MK(HK) and, in response to receiving, the encrypted key MK(HK), stores the encrypted key MK(HK) in a database 143, at 141. The second device 104 receives the encrypted key MK(HK) and, in response to receiving, the encrypted key MK(HK), stores the encrypted key MK(HK) in a database 144, at 142. At 150, the first server 101 destroys the HK. At 160, the first server 101 retains the MK by storing the MK in a local or external secure key storage. In some examples, at one or more of 110, 130, or 160, the first server 101 protect the MK and HK, where the first server 101 is, includes, or is using a Hardware Security Module (HSM) for generating (e.g., 110), encrypting (e.g., 130), retaining (e.g., 160), and decrypting keys.

At 170, the first server 101 generates an ID, such as a domain identifier $D_1$. The domain identifier $D_1$ can be handled as public data, sensitive data, or confidential data without risking the keys. At 180, the first server 101 stores the ID in an internal memory or database of the first server 101, and provides the ID to the first device 103 and the second device 104. In some examples, the first server 101 manages keys for multiple domains, such that the first server 101 may generate multiple IDs (e.g., $D_1, D_2, \ldots, D_n$) each for a respective domain. In that regard, the first server 101 can store a mapping among the domain IDs and the device IDs that identify devices such as the devices 103 and 104. A device ID can include a device name, network address, device identifier such as International Mobile Equipment Identity (IMEI), and so on. Each of the devices 103 and 104 can store a similar mapping to identify the first server 101. This allows the first server 101 to look up the device IDs corresponding to a domain ID and to send information and data to or receive information and data from the devices 103 and 104. At 191, in response to receiving the domain ID, the first device 103 stores the domain ID at 191 in a database 193. The database 193 can be the same as or different from the database 143. At 192, in response to receiving the domain ID, the second device 104 stores the domain ID at 192 in a database 194. The database 194 can be the same as or different from the database 144.

Figure 2:
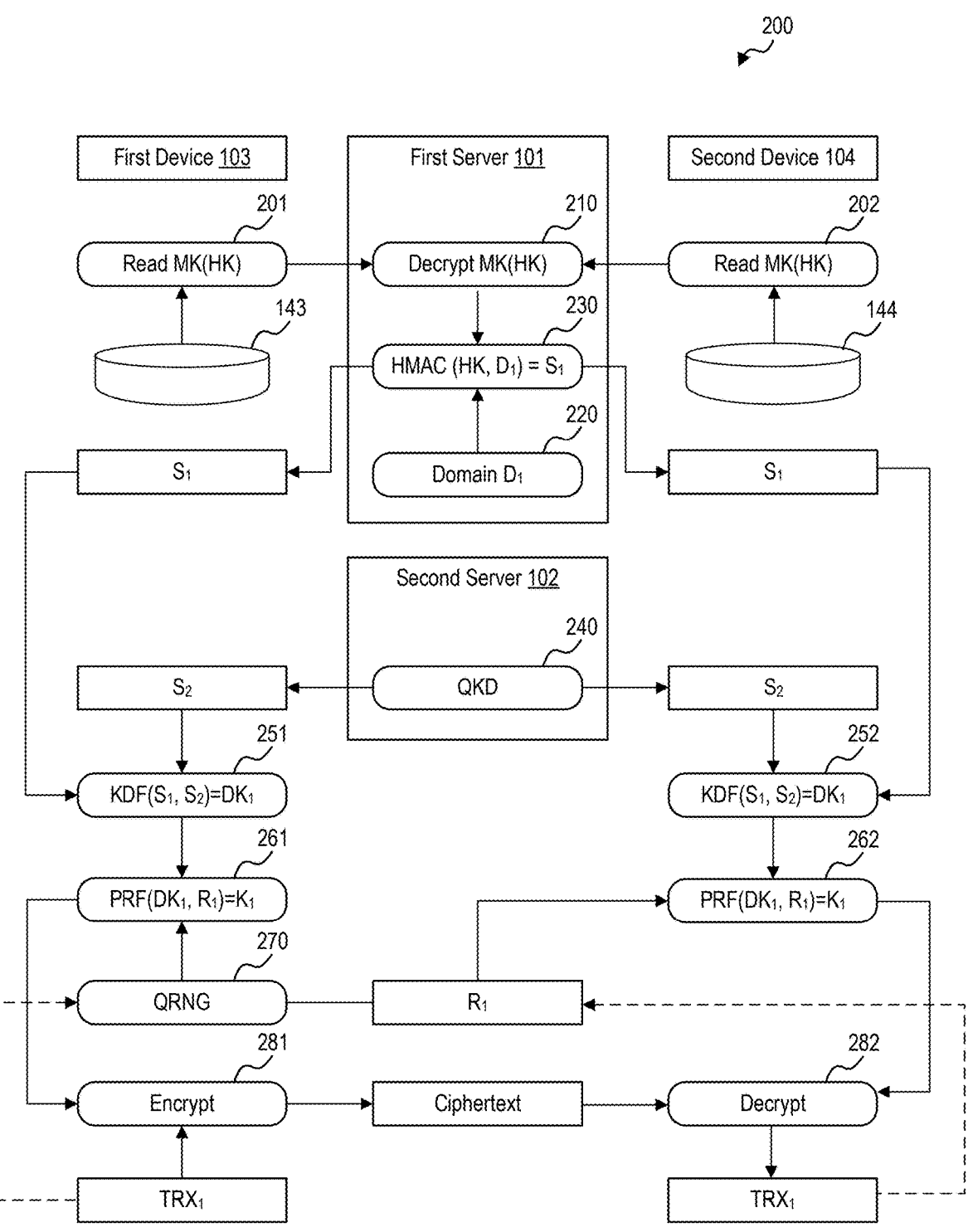
FIG. 2 is a schematic diagram illustrating an example method for key generation and encryption between two participants within a same security domain, according to various arrangements.

FIG. 2 is a schematic diagram illustrating an example method 200 for key generation and encryption between two participants within a same security domain, according to various arrangements. The method 200 can be performed using the first server 101, a second server 102, the first device 103, and the second device 104. The blocks in the central column of FIG. 2 are performed by the first server 101 (e.g., a central service) or the second server 102. The blocks in the left column of FIG. 2 are performed by the first device 103. The blocks in the right column of FIG. 2 are performed by the second device 104. In FIG. 2, the HK is to be used by the first device 103 (e.g., a sender) to generate a first seed $S_1$, which is used by the devices 103 and 104 (along with $S_2$) to generate the DK.

Each participant within the security domain sends its respective encrypted key MK(HK) to the central service. For example, at 201, the first device 103 reads the encrypted key MK(HK) from the database 143 and provides (e.g., sends) the encrypted key MK(HK) to the first server 101. At 202, the second device 104 reads the encrypted key MK(HK) from the database 144 and provides (e.g., sends) the encrypted key MK(HK) to the first server 101.

In response to receiving the same encrypted key MK(HK) from the devices 103 and 104 belonging to a same security domain identified by the same domain ID $D_1$, the first server 101 decrypts the encrypted key MK(HK) using the MK to obtain the HK, at 210. The first server 101 determines the domain ID $D_1$ (e.g., via the mapping between the devices 103 and 104 and the domain ID $D_1$) at 220. At 230, the first server 101 generates the first seed $S_1$ using HMAC with HK and domain identifier $D_1$, e.g., HMAC (HK, $D_1$)=$S_1$, and returns the seed $S_1$ to each participant (e.g., each of the first device 103 or the second device 104). The first server 101 retains MK but destroys HK in response to returning the first seed $S_1$ to the devices 103 and 104.

Each participant within the security domain receives a second seed $S_2$ from a shared QKD or Entropy-as-a-Service (EaaS) service. For example, a second server 102 which includes a QKD device 240 (e.g., EaaS) provides the second seed $S_2$ to each of the first device 103 or the second device 104. Both participants use a KDF with the two seeds $S_1$ and $S_2$ to generate a derived key $DK_1$. For example, at 251, the first device 103 generates derived key $DK_1$ by applying the first seed $S_1$ and the second seed $S_2$ as inputs into the KDF, e.g., KDF ($S_1$, $S_2$)=$DK_1$. At 252, the second device 104 generates the same derived key $DK_1$ by applying the first seed $S_1$ and the second seed $S_2$ as inputs into the same KDF, e.g., KDF ($S_1$, $S_2$)=$DK_1$. Given that neither the central service (e.g., the first server 101) nor the QKD service (e.g., the second server 102) has access to both the seeds $S_1$ and $S_2$ or the KDF, neither the central service nor the QKD service can generate the derived key $DK_1$ or the key $K_1$. In the methods disclosed herein, an attacker is required to compromise or have access to both $S_1$ and $S_2$ communication channels and have access to KDF to generate $DK_1$, which is extremely challenging.

The first device 103 (e.g., the sender) uses a Pseudo Random Function (PRF) with the derived key $DK_1$ and a random number $R_1$ from a QRNG 270 to derive the first key $K_1$, e.g., PRF ($DK_1$, $R_1$)=$K_1$. The PRF can be different from the KDF in some examples. The first device 103 encrypts first data (e.g., data for the first transaction $TRX_1$) using the first key $K_1$ at 281 to determine the ciphertext. Depending on the symmetric encryption mode such as Cipher Block Chaining (CBC), Counter (CTR), Galois/Counter Mode (GCM), XEX-based Tweaked-codebook Mode with cipher-text Stealing (XTS), and so on, there can be other input parameters such as an Initialization Value (IV), Initial Counter (IC), Additional Authentication Data (AAD) to be shared between the devices 103 and 104 along with $R_1$ and the TRX. The first device 130 provides the ciphertext encapsulated with the first random number $R_1$ to the second device 104. It is highly unlikely that an eavesdropper would be able to decrypt the ciphertext given that the eavesdropper does not have the first key $K_1$, the derived key $DK_1$, the seeds $S_1$ and $S_2$, and might not know the KDF or the PRF. In response to receiving the ciphertext and random number $R_1$, the second device 104 (e.g., the receiver) uses the same PRF with $DK_1$ and $R_1$ to derive the same $K_1$, e.g., PRF ($DK_1$, $R_1$)=$K_1$. The second device 104 decrypts the ciphertext to recover the cleartext data corresponding to $TRX_1$.

The method 200 can proceed to a next iteration for cleartext data corresponding to $TRX_2$, $TRX_3$, . . . , $TRX_n$. For example, the first device 103 (e.g., the sender) uses the PRF with the derived key $DK_1$ and a random number $R_n$ from the QRNG 270 to derive the nth key $K_n$, e.g., PRF ($DK_1$, $R_n$)=$K_n$. The first device 103 encrypts nth data (e.g., data for the nth transaction $TRX_n$) using the nth key $K_n$ at 281 to determine the ciphertext. The first device 130 provides the ciphertext encapsulated with the nth random number $R_n$ to the second device 104. In response to receiving the ciphertext and random number $R_n$, the second device 104 (e.g., the receiver) uses the same PRF with $DK_1$ and $R_n$ to derive the same $K_n$, e.g., PRF ($DK_1$, $R_n$)=$K_n$. The second device 104 decrypts the ciphertext to recover the cleartext data corresponding to $TRX_n$. When the first device 130 and the second device 140 have ended their communications session including of one or more transactions, or at the end of some predetermined interval based on length of time or amount of data, the current $DK_1$ lifecycle is likewise ended and $DK_1$ can be destroyed by the devices 103 and 104, such that a new $DK_2$ derived from new seeds $S_1$ and/or $S_2$ can be established for a new communication session.

In some arrangements, the cleartext data corresponding to $TRX_n$ described herein can be any type of information. Examples of the cleartext data can include a Personal Identification Number (PIN), a Primary Account Number (PAN) which is the payment card number (e.g., a credit card number, a debit card number, and the like), a financial account number, a password, social security number, a name, an address, an email address, or any Personally Identifiable Information (PII) or Protected Health Information (PHI). In some examples, the cleartext data can be a security object (e.g., a token, a certificate, and the like). In some examples, the cleartext data can be a seed for key-generation (e.g., for generating a One-Time-Password (OTP)). The cleartext data refers to any information that needs protection during transmission from the first device 103 to the second device 104.

Communications among the first server 101, the second server 102, the first device 103, and the second device 104 as described herein can be performed using a network. The network is structured to permit the exchange (e.g., the providing, sending, and receiving) of data, values, instructions, messages, and the like. The network can be any suitable Local Area Network (LAN), Wide Area Network (WAN), or a combination thereof. For example, the network can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like.

Figure 3:
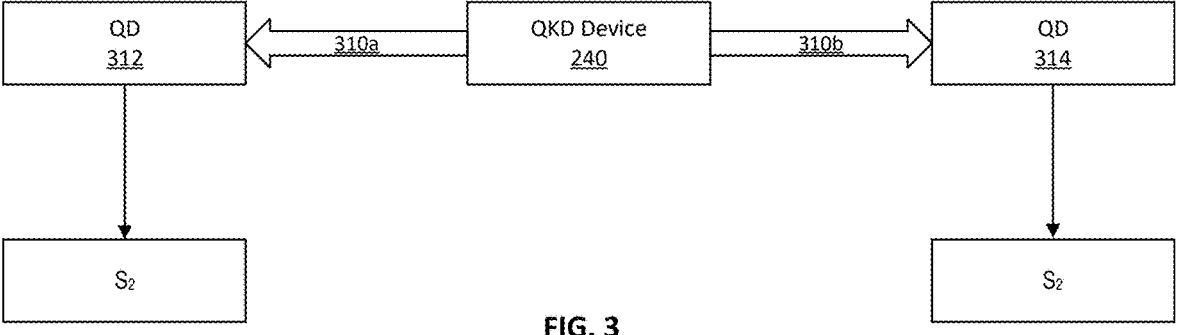
FIG. 3 is a schematic diagram illustrating QKD by the central server to the participant devices, according to some arrangements.

FIG. 3 is a schematic block diagram illustrating QKD by the central server (e.g., the first server 101) to the participant devices 103 and 104, according to some arrangements. In some examples, the first device 103 and the second device 104 can establish the second seed $S_2$ using any suitable key distribution methods, including QKD. For example, the first device 103 has a Quantum Device (QD) 312, and the second device 104 has a QD 314. A QKD device can perform QKD with the QDs 312 and 314 of the first and second devices 103 and 104. For example, the first device 103 uses its QD 312 to measure the QKD transmission of photons (e.g., entangled or regular, unentangled particles) from the QKD device 240 to generate the second seed $S_2$. In some examples, the QD 312 of the first device 103 can be a Quantum Entangled Device (QED) that measures transmissions (e.g., quantum entangled particles or photons) received from the QKD device 240. In some examples, the QD of the first device 103 can be a device configured to measure regular, non-entangled quantum particles or photons received from the QKD device.

The second device 104 uses its QD 314 to measure the QKD transmission of photons (e.g., entangled or regular, unentangled particles) from the QKD device 240 to generate second seed $S_2$. In some examples, the QD 314 of the second device 104 can be a QED that measures transmissions (e.g., quantum entangled particles or photons) received from the QKD device 240. In some examples, the QD 314 of the second device 104 can be a device configured to measure regular, non-entangled quantum particles or phones received from the QKD device 240. The QDs 312 and 314 of the first and second devices 103 and 104 are the same type of quantum devices.

QKD is mechanism by which the second seed $S_2$ are established between two communicating parties, such as the devices 103 and 104. Example QKD protocols include the BB84 protocol and the E91 protocol. The QKD device 240 generates two steams of quantum particles 310a and 310b (e.g., photons containing information such as a string of binary zeroes and ones) and sends one stream to QD 312 of the first device 103 and another to QD 314 of the second device 104. The quantum particles 310a and 310b can be quantum entangled particles or regular non-entangled particles. In some examples, each stream of the quantum particles 310a and 310b includes random bits.

The QDs 312 and 314 both read the quantum particles 310a and 310b, respectively interpreting the same string of binary zeroes and ones and converting the same into second seed $S_2$. The devices 103 and 104 can resolve metrics to determine the second seed $S_2$. For example, the QKD scheme can be used for EaaS where the quantum metrics translate the photons into random bits for the second seed $S_2$. The devices 103 and 104 can use a separate communication channel to statically verify that the devices 103 and 104 have read and interpreted the particles correctly, e.g., the second seed $S_2$ read by the devices 103 and 104 are the same.

In the examples in which the quantum particles 310a and 310b are entangled, one device reading the entangled quantum particles 310a or 310b before another device destroys the entanglement given that although the another device reads the same information, the entangled particles are affected by the prior reading of the entangled particles. Thus, if another attempt is made by one of the devices 103 and 104 or an attacker to re-read the same stream, the affected particles become no longer entangled, resulting in a different interpretation. Further, an attacker reading a stream before the devices 103 and 104 breaks the entanglement such that when the devices 103 and 104 reads the stream, the reading affects the particles, and the devices 103 and 104 will obtain an invalid interpretation. An attacker reading the stream after the devices 103 and 104 read the stream also affects the detangled particles, and devices 103 and 104 will obtain an invalid interpretation. QKD allows an attacker to be detected such that the devices 103 and 104 and the QDs 312 and 314 have knowledge of the attack by detecting invalid interpretation, thus refraining from using the stream to establish the second seed $S_2$.

Figure 4:
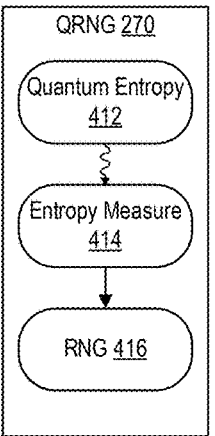
FIG. 4 is a schematic diagram illustrating the QRNG, according to some arrangements.

FIG. 4 is a schematic diagram illustrating the QRNG 270 of the first device 130, according to some arrangements. The QRNG 270 includes at least a quantum entropy 412, an entropy measure function 414, and a Random Number Generator (RNG) 416. In some examples, the QRNG 270 includes a QKD device. The QRNG 270 can perform an external RNG process using the quantum entropy 412.

The quantum entropy 412 includes one or more quantum entropy sources that can generate a steam of photons containing information such as a string of binary zeroes and ones (e.g., quantum entangled particles or unentangled particles) and sends the stream to a computing system implementing the entropy measurement function 414. The quantum entropy sources can generate quantum entangled particles that contain unpredictable information, thus "random." The quantum entangled particles are measured and interpreted by the entropy measure function 414 to obtain "random bits" which are fed into the RNG 416 to generate sufficiently "random bits" corresponding to $R_n$ in FIG. 2. In some examples, the QRNG 270 can be a remote to the device 103 and can provide $R_n$ via a network. In some examples, the QRNG 270 can be a device operatively coupled or physically connected to the first device 103. In some examples, the QRNG 270 and the first device 103 can be located in a same device (e.g., a same network node).

FIG. 5 is a flowchart diagram illustrating an example method 500 for first server 101 and the second server 102 to provide seeds $S_1$ and $S_2$ to the first device 103 and the second device 104, according to various arrangements. The methods 100 and 200 are example implementations of the method 500. The method 500 can be performed by the first server 101 and the second server 102. In the examples in which either server 101 or server 102 are temporarily unavailable, the first device 103 and second device 104 can bilaterally decide to extend the lifecycle of either $S_1$ or $S_2$ to avoid a communications interruption, in some examples. In some examples, the first device 103 and second device 104 can collect and queue up additional seeds as a preventive measure in the event that the servers 101 or 102 become unavailable, to perform the method 200 without real-time provision of $S_1$ and $S_2$ by the servers 101 and 102.

At 510, the first server 101 generates a first seed $S_1$ using the HMAC (e.g., at 230) based at least in part on an HK. At 520, the first server 101 provides (e.g., sends over the network) to each of the first device 103 or the second device 104, the first seed $S_1$. At 530, the second server 102 provides (e.g., sends over the network) to each of the first device or the second device a second seed $S_2$. The second seed $S_2$ is based at least in part on a stream of photons. Each of the first device 103 or the second device 104 generates the DK based at least in part on the first seed $S_1$ and the second seed $S_2$. Each of the first device 103 or the second device 104 generates a first key $K_1$ based at least in part on the DK and a first random number $R_1$ generated by a QRNG 270. The first device 103 encrypts first data using the first key $K_1$ to obtain first ciphertext and provides the first ciphertext, and $R_1$, and other encryption mode-dependent parameters described herein to the second device 104. The second device 104 derives the first key $K_1$ and decrypts the first ciphertext using the first key $K_1$.

In some examples, the method 500 further includes receiving, by the first server 101 from the first device 103, a first encrypted key MK(HK). The first encrypted key includes the HK encrypted using a MK. The method 500 further includes receiving, by the first server 101 from the second device 104, a second encrypted key MK(HK). The second encrypted key includes the HK encrypted using the MK. The first encrypted key is the same as the second encrypted key. In some examples, the method 500 further includes decrypting, by the first server 101, the first encrypted key using the MK to obtain the HK. In some examples, the method 500 further includes decrypting, by the first server 101, the second encrypted key using the MK to obtain the HK.

In some examples, generating the first seed $S_1$ includes applying as inputs to the HMAC the HK and an identifier of a domain of the first device 103 and the second device 104, the HMAC outputs the first seed $S_1$.

In some examples, the second server 102 includes the QKD service 240. The QKD service 240 distributes the stream of photons to each of the first device 103 or the second device 104. Each of the first device 103 or the second device 104 measures the stream of photons to determine random key bits. The first device 103 or the second device 104 resolve metrics to determine shared key bits corresponding to the second seed $S_2$.

In some examples, the method 500 further includes generating, by the first server 101, a MK, generating, by the first server 101, the HK, encrypting, by the first server 101, the HK with the MK to obtain an encrypted key, and providing, by the first server 101 to each of the first device 103 or the second device 104, the encrypted key MK(HK). In some examples, the method 500 further includes destroying, by the first server 101, the HK and retaining, by the first server 101, the MK.

In some examples, the method 500 further includes generating, by the first server 101, an identifier of a domain of the first device 103 and the second device 104 and providing, by the first server 101 to each of the first device 103 or the second device 104, the identifier of the domain. In some examples, the domain name and the corresponding identifier can be changed from time-to-time, in response to a detected incident (e.g., a security breach) or periodically as rotated on a regular basis (e.g., using a timestamp, etc.) This can in turn change $S_1$.

FIG. 6 is a schematic diagram illustrating an example method for key generation and encryption between two participants (e.g., the first device 103 and the second device 104) within a same security domain, according to various arrangements. The methods 100 and 200 are example implementations of the method 600. The method 600 can be performed by the first device 103.

At 610, the first device 103 receives from a first server 101, first seed $S_1$. The first seed $S_1$ is generated using a HMAC 230 based at least in part on an HK. At 620, the first device 103 receives from the second server 102, a second seed $S_2$. The second seed $S_2$ is based at least in part on a stream of photons. At 630, the first device 103 generates a DK (e.g., $DK_1$) based at least in part on the first seed $S_1$ and the second seed $S_2$. At 640, the first device 103 generates a first key $K_1$ based at least in part on the DK and a first random number generated by the QRNG 270. At 650, the first device 103 encrypts first data using the first key to obtain first ciphertext. At 660, the first device 103 provides (e.g., sends via the network) to the second device 104, the first ciphertext. The second device 104 derives the first key $K_1$ and decrypts the first ciphertext using the first key.

In some examples, the method 600 further includes reading, by the first device 103, a first encrypted key MK(HK) from a database 143 of the first device 103. The first encrypted key includes the HK encrypted using a MK. The first device 103 provides to the first server 101 the first encrypted key.

In some examples, the first seed $S_1$ is generated by applying as inputs to the HMAC the HK and an identifier of a domain of the first device 103 and the second device 104, the HMAC outputs the first seed $S_1$. In some examples, the second server 102 includes a QKD service 240. The QKD service 240 distributes the stream of photons to the first device 103. The first device 103 measures the stream of photons to determine random key bits. The first device 103 resolves metrics with the second device 104 to determine shared key bits corresponding to the second seed $S_2$.

In some examples, generating the DK includes applying as inputs to a KDF the first seed $S_1$ and the second seed $S_2$, the KDF outputs the DK. In some examples, generating the first key $K_1$ includes applying as inputs to a PRF the DK and a first random number $R_1$, the PRF outputs the first key $K_1$.

In some examples, the method 600 further includes generating, by the first device 103, a second key $K_2$ based at least in part on the DK (e.g., $DK_1$) and a second random number $K_2$ generated by the QRNG 270, encrypting, by the first device 103, second data using the second key $K_2$ to obtain second ciphertext, and providing, by the first device 103 to the second device 104, the second ciphertext. The second device 104 derives the second key $K_2$ and decrypts the second ciphertext using the second key $K_2$.

FIG. 7 is a schematic diagram illustrating an example method for key generation and encryption between two participants (e.g., the first device 103 and the second device 104) within a same security domain, according to various arrangements. The methods 100 and 200 are example implementations of the method 700. The method 700 can be performed by the second device 104.

At 710, the second device 104 receives from a first server 101, a first seed $S_1$. The first seed $S_1$ is generated using a HMAC 230 based at least in part on an HK. At 720, the second device 104 receives from the second server 102, a second seed $S_2$. The second seed $S_2$ is based at least in part on a stream of photons. At 730, the second device 104 generates a DK (e.g., $DK_1$) based at least in part on the first seed $S_1$ and the second seed $S_2$. At 740, the second device 104 receives from the first device 103, a first ciphertext and a first random number $R_1$, the first random number Riis generated by the QRNG 270. At 750, the second device 104 generates a first key $K_1$ based at least in part on the DK and the first random number $R_1$. At 760, the second device 104 the first ciphertext using the first key $K_1$ to obtain first data.

In some examples, the method 700 further includes reading, by the second device 104, a second encrypted key MK(HK) from a database 144 of the second device 104. The second encrypted key includes the HK encrypted using a MK. The second device 104 provides to the first server 101 the second encrypted key.

In some examples, generating the DK includes applying as inputs to a KDF the first seed $S_1$ and the second seed $S_2$, the KDF outputs the DK. In some examples, generating the first key $K_1$ includes applying as inputs to a PRF the DK and a first random number $R_1$, the PRF outputs the first key $K_1$.

In some examples, the method 600 further includes receiving, by the second device 104 from the first device 103, a second ciphertext and a second random number $R_2$, the second random number $R_2$ is generated by the QRNG 270, generating, by the second device 104, a second key $K_2$ based at least in part on the DK (e.g., $DK_1$) and the second random number $R_2$, decrypting, by the second device 104, the second ciphertext using the second key $K_2$ to obtain second data.

FIG. 8 illustrates block diagrams of an examples of the first server 101, the first device 103, and the second device 104, according to some arrangements. The first server 101, the first device 103, and the second device 104 are shown to include various circuits and logic for implementing the operations described herein. More particularly, the first device 103 includes one or more of a processing circuit 812, a network interface circuit 818, a cryptography circuit 820, the database 143, the database 193, and an application circuit 825. The second device 104 includes one or more of a processing circuit 832, a network interface circuit 838, a cryptography circuit 840 the database 144, the database 194, and an application circuit 845. The first server 101 includes one or more of a processing circuit 852, a network interface circuit 858, and a cryptography service system 860. While various circuits, interfaces, and logic with particular functionality are shown, it should be understood that the devices 103 and 104 and the first server 10 can include any number of circuits, interfaces, and logic for facilitating the operations described herein. For example, the activities of multiple circuits are combined as a single circuit and implemented on a same processing circuit (e.g., the processing circuit 812, 832, or 852), as additional circuits with additional functionality are included.

In some arrangements, the processing circuit 812 includes a processor 814 and a memory 816. The processor 814 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 816 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory 816 is or includes tangible, non-transient volatile memory or non-volatile memory. Accordingly, the memory 816 includes database components, object code components, script components, or any other type of information structure for supporting the various activities and information structures described herein. The processing circuit 812 can be used to implement one or more of the circuits 818, 820, 143, 193, or 825.

The network interface circuit 818 is configured for and structured to establish a connection and communicate with the first server 101 and the second device 104 via a network or another suitable wired, wireless, or physical connection. The network interface circuit 818 is structured for sending and receiving data over a communication network or a physical connection (e.g., via a physical connector such as Universal Serial Bus (USB)). Accordingly, the network interface circuit 818 includes any of a cellular transceiver (for cellular standards), wireless network transceiver (for 802.11X, ZigBee, Bluetooth, Wi-Fi, or the like), wired network interface, or a combination thereof. For example, the network interface circuit 818 may include wireless or wired network modems, ports, baseband processors, and associated software and firmware.

The cryptography circuit 820 is executed by the processing circuit 812 in some arrangements. The cryptography circuit 820 can perform cryptographic operations (e.g., the methods performed by the first device 103 described herein) such as the cryptographic functions (e.g., the KDF 251, the PRF 261, QRNG 270, and the encryption 281) in the manner described. The first device 103 can provide the cryptography circuit 820 in various manners. In some arrangements, the cryptography circuit 820 is a server-based application executable on the first device 103. In this regard, the user of the first device 103 has to download the cryptography circuit 820 from an application download server prior to usage. In some arrangements, the cryptography circuit 820 is a web-based interface application provided by an application server. In some arrangements, the cryptography circuit 820 includes an API and/or an SDK provided by the application server that facilitates integration with other applications. In some arrangements, the cryptography circuit 820 is coded into the memory 816 of the first device 103. All such variations and combinations are intended to fall within the spirit and scope of the present disclosure. The cryptography circuit 820 includes the QRNG 270 and the QD 312.

The first device 103 further includes the database 143 that stores encrypted keys MK(HK), each corresponding to a different one of multiple domains that the first device 103 belongs. The first device 103 further includes the database 193 that stores domain IDs, each corresponding to a different one of multiple domains that the first device 103 belongs.

The application circuit 825 executes an application, software, firmware, or code for which cryptographic operations are needed to encrypt data, decrypt data, encrypt another cryptographic material, decrypt another cryptographic material, sign data, verify data, signcrypt data, and so on. For example, the application circuit 825 can execute base or ground station communication protocol, a mobile banking application, mobile wallet, a browser, a word processing application, a mobile banking application, a mobile wallet, a Graphic User Interface (GUI), an email reader/client, a File Transfer Protocol (FTP) client, a virtual machine application and so on. For example, application circuit 825 can execute an application, software, firmware, or code for which data (e.g., message, code, document, file, program or application, etc.) needs to be encrypted, decrypted, signed, or for which a signature on the signed data needs to be verified.

In some arrangements, the processing circuit 832 has a processor 834 and memory 836. The processor 834 is a processing component such as the processor 814. The memory 836 is a memory device such as the memory 816. The processing circuit 832 can be used to implement one or more of the circuits 838 and 840.

The network interface circuit 838 is a network device such as the network interface circuit 818. The network interface circuit 838 is configured for and structured to establish a connection and communicate with the first server 101 and the first device 103 via the network or another suitable wired, wireless, or physical connection.

The cryptography circuit 840 can be implemented with the processing circuit 832 or a separate processing circuit similar to the processing circuit 832. In some arrangements, the cryptography circuit 840 can perform cryptographic operations (e.g., the methods performed by the second device 104 described herein) such as the cryptographic functions (e.g., the KDF 252, the PRF 262, and the decryption 282) in the manner described. Illustrating with a non-limiting example, the cryptography circuit 840 provides a host-based application to be downloaded by the second device 104. For example, the cryptography circuit 840 provides a web-based application to be accessed by the second device 104 or coded into the memory 836 of the second device 104. The cryptography circuit 840 includes an API and/or an SDK facilitates integration with other applications. All such variations and combinations are intended to fall within the spirit and scope of the present disclosure. The cryptography circuit 840 includes the QD 314.

The application circuit 845 executes an application, software, firmware, or code for which cryptographic operations are needed to encrypt data, decrypt data, encrypt another cryptographic material, decrypt another cryptographic material, sign data, verify data, signcrypt data, and so on. For example, the application circuit 845 can execute base or ground station communication protocol, a mobile banking application, mobile wallet, a browser, a word processing application, a mobile banking application, a mobile wallet, a GUI, an email reader/client, a FTP client, a virtual machine application and so on. For example, application circuit 825 can execute an application, software, firmware, or code for which data (e.g., message, code, document, file, program or application, etc.) needs to be encrypted, decrypted, signed, or for which a signature on the signed data needs to be verified.

The second device 104 further includes the database 145 that stores encrypted keys MK(HK), each corresponding to a different one of multiple domains that the second device 104 belongs. The second device 104 further includes the database 194 that stores domain IDs, each corresponding to a different one of multiple domains that the second device 104 belongs.

In some arrangements, the processing circuit 852 has a processor 854 and memory 856. The processor 854 is a processing component such as the processor 814. The memory 856 is a memory device such as the memory 816. The processing circuit 852 can be used to implement one or more of the circuits 858 and 860.

The network interface circuit 858 is a network device such as the network interface circuit 818. The network interface circuit 858 is configured for and structured to establish a connection and communicate with the first device 103 and the second device 104 via the network or another suitable wired, wireless, or physical connection.

The cryptography service system 860 can be implemented with the processing circuit 852 or a separate processing circuit similar to the processing circuit 852. In some arrangements, the cryptography service system 860 can perform cryptographic operations (e.g., the methods performed by the first server 101 described herein) such as the cryptographic functions (e.g., key generation 110, 120, encryption 130, decryption 210, HMAC 230) in the manner described. Illustrating with a non-limiting example, the cryptography service system 860 provides a host-based application to be downloaded by the first server 101. For example, the cryptography service system 860 provides a web-based application to be accessed by the first sever 101 or coded into the memory 856 of the first server 101. The cryptography service system 860 includes an API and/or an SDK facilitates integration with other applications. All such variations and combinations are intended to fall within the spirit and scope of the present disclosure. The cryptography service system 860 includes a database 862 for storing the MKs (e.g., retained at 160) for each of a plurality of domains managed by the first sever 101. The cryptography service system 860 includes a database 864 for storing domain IDs (e.g., stored at 180) for each of a plurality of domains managed by the first sever 101.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:
   generating, by a first server, a first seed using a Hash-Based Message Authentication Code (HMAC) based at least in part on a Hash Key (HK);
   providing, by the first server to each of a first device and a second device, the first seed;

providing, by a second server to each of the first device or the second device, a second seed, wherein the second seed is based at least in part on a stream of photons, wherein each of the first device or the second device generates a Derived Key (DK) based at least in part on the first seed and the second seed, each of the first device or the second device generates a first key based at least in part on the DK and a first random number generated by a Quantum Random Number Generator (QRNG), the first device encrypts first data using the first key to obtain first ciphertext and provides the first ciphertext to the second device, and the second device derives the first key and decrypts the first ciphertext using the first key;

generating, by the first server, a Master Key (MK);

generating, by the first server, the HK;

encrypting, by the first server, the HK with the MK to obtain an encrypted key; and providing, by the first server to each of the first device or the second device, the encrypted key;

destroying, by the first server, the HK; and retaining, by the first server, the MK.

2. The method of claim 1, further comprising:

receiving, by the first server from the first device, a first encrypted key, the first encrypted key comprises the HK encrypted using a Master Key (MK); and receiving, by the first server from the second device, a second encrypted key, the second encrypted key comprises the HK encrypted using the MK, the first encrypted key is the same as the second encrypted key.

3. The method of claim 2, further comprising at least one of:

decrypting, by the first server, the first encrypted key using the MK to obtain the HK; or decrypting, by the first server, the second encrypted key using the MK to obtain the HK.

4. The method of claim 1, wherein generating the first seed comprises applying as inputs to the HMAC the HK and an identifier of a domain of the first device and the second device, the HMAC outputs the first seed.

5. The method of claim 1, wherein the second server comprises a Quantum Key Distribution (QKD) service, the QKD service distributes the stream of photons to each of the first device or the second device, each of the first device or the second device measures the stream of photons to determine random key bits, and the first device or the second device resolve metrics to determine shared key bits corresponding to the second seed.

6. The method of claim 1, further comprising:

generating, by the first server, an identifier of a domain of the first device and the second device;

providing, by the first server to each of the first device or the second device, the identifier of the domain.

7. A method, comprising:

receiving, by a first device from a first server, a first seed, wherein the first seed is generated using a Hash-Based Message Authentication Code (HMAC) based at least in part on a Hash Key (HK);

receiving, by the first device from a second server, a second seed, wherein the second seed is based at least in part on a stream of photons;

generating, by the first device, a Derived Key (DK) based at least in part on the first seed and the second seed;

generating, by the first device, a first key based at least in part on the DK and a first random number generated by a Quantum Random Number Generator (QRNG);

encrypting, by the first device, first data using the first key to obtain first ciphertext; and providing, by the first device to the second device, the first ciphertext, wherein the second device derives the first key and decrypts the first ciphertext using the first key, wherein generating the DK comprises applying as inputs to a Key Derivation Function (KDF) the first seed and the second seed, the KDF outputs the DK, and generating the first key comprises applying as inputs to a Pseudo Random Function (PRF) the DK and a first random number, the PRF outputs the first key.

8. The method of claim 7, further comprising:

reading, by the first device, a first encrypted key from a database of the first device, wherein the first encrypted key comprises the HK encrypted using a Master Key (MK); and providing, by the first device to the first server, the first encrypted key.

9. The method of claim 7, wherein the first seed is generated by applying as inputs to the HMAC the HK and an identifier of a domain of the first device and the second device, the HMAC outputs the first seed.

10. The method of claim 7, wherein the second server comprises a Quantum Key Distribution (QKD) service, the QKD service distributes the stream of photons to the first device, the first device measures the stream of photons to determine random key bits, and the first device resolves metrics with the second device to determine shared key bits corresponding to the second seed.

11. The method of claim 7, further comprising:

generating, by the first device, a second key based at least in part on the DK and a second random number generated by the QRNG;

encrypting, by the first device, second data using the second key to obtain second ciphertext; and providing, by the first device to the second device, the second ciphertext, wherein the second device derives the second key and decrypts the second ciphertext using the second key.

12. A method, comprising:

receiving, by a second device from a first server, a first seed, wherein the first seed is generated using a Hash-Based Message Authentication Code (HMAC) based at least in part on a Hash Key (HK);

receiving, by the second device from a second server, a second seed, wherein the second seed is based at least in part on a stream of photons;

generating, by the second device, a Derived Key (DK) based at least in part on the first seed and the second seed;

receiving, by the second device from the first device, a first ciphertext and a first random number, the first random number is generated by a Quantum Random Number Generator (QRNG);

generating, by the second device, a first key based at least in part on the DK and the first random number;

decrypting, by the second device, the first ciphertext using the first key to obtain first data, wherein generating the DK comprises applying as inputs to a Key Derivation Function (KDF) the first seed and the second seed, the KDF outputs the DK, and generating the first key comprises applying as inputs to a Pseudo Random Function (PRF) the DK and a first random number, the PRF outputs the first key.

13. The method of claim 12, further comprising:

reading, by the second device, a second encrypted key from a database of the second device, wherein the second encrypted key comprises the HK encrypted using a Master Key (MK); and providing, by the second device to the first server, the second encrypted key.

14. The method of claim 12, further comprising:

receiving, by the second device from the first device, a second ciphertext and a second random number, the second random number is generated by the QRNG;

generating, by the second device, a second key based at least in part on the DK and the second random number;

decrypting, by the second device, the second ciphertext using the second key to obtain second data.

* * * * *